United States Patent [19]

Eimers et al.

[11] 3,758,556

[45] Sept. 11, 1973

[54] POLYESTERS CONTAINING TERTIARY NITROGEN ATOMS

[75] Inventors: Erich Eimers, Krefeld; Hans Rudolph; Werner Kloker, both of Krefeld-Bockum, all of Germany

[73] Assignee: Bayer Aktiengesellschaft, Leverkusen, Germany

[22] Filed: Oct. 28, 1971

[21] Appl. No.: 193,553

Related U.S. Application Data

[62] Division of Ser. No. 64,822, Aug. 18, 1970, Pat. No. 3,646,160.

[30] Foreign Application Priority Data

Aug. 29, 1969 Germany.................. P 19 43 954.4

[52] U.S. Cl. ........................... 260/485 G, 260/468 K
[51] Int. Cl. ............................................. C07c 69/44
[58] Field of Search ..................... 260/475 P, 485 G

[56] References Cited

OTHER PUBLICATIONS

Sulzberg et al., Macromolecules 1969, 2(2) pp. 146–153, Mar.–April (1969).

*Primary Examiner*—Lorraine A. Weinberger
*Assistant Examiner*—E. Jane Skelly
*Attorney*— Arthur G. Connolly, Nicholas E. Oglesby, Jr. et al.

[57] ABSTRACT

The invention relates to novel linear polyesters containing hydroxy end groups and an N,N-bis-($\beta$-sec.hydroxy-alkyl)-p-alkylphenylamine and certain dicarboxylic acids condensed therein. These novel polyesters are useful as accelerators for mixtures of unsaturated polyesters and copolymerizable monomers which harden at room temperature after the addition of a diacyl peroxide catalyst.

2 Claims, No Drawings

POLYESTERS CONTAINING TERTIARY NITROGEN ATOMS

CROSS-REFERENCE TO RELATED APPLICATION

This application is a division of application Ser. No. 64,822 filed Aug. 18, 1970 and now U.S. Pat. No. 3,646,160.

The invention provides polyesters containing tertiary nitrogen atoms, of formula

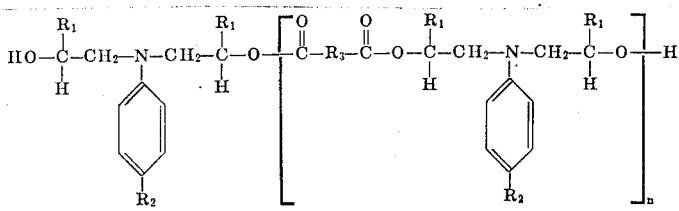

(1)

wherein
- $R_1$ denotes the methyl or ethyl group,
- $R_2$ denotes an alkyl group with one to six carbon atoms,
- $R_3$ denotes a saturated, straight-chain or branched, alkylene group with four to 12 carbon atoms, or a saturated cycloalkylene group or an arylene group of which the dicarboxylic acids do not form cyclic anhydrides, and
- $n$ denotes an integer from 2 to 100.

The invention further provides a curable resin composition comprising an unsaturated polyester dissolved in a monomer copolymerizable therewith and 0.1 to 5 per cent by weight of a polyester of the invention as a curing accelerator. These compositions are curable without heat applying by the further addition of a diacyl peroxide.

It is known from the U.S. Pat. No. 2,812,313 to react tertiary amines of formula

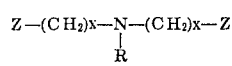

wherein
- R denotes a phenylene radical which is optionally alkyl-substituted, preferably methyl-substituted, in the p-position,
- Z optionally denotes a hydroxyl group and x denotes an integer from 1 to 6, preferably 2, with a dicarboxylic acid and preferably phthalic anhydride to give a polyester, and also to add this as a cure accelerator to unsaturated polyester resin compositions. The polyesters of the present invention differ from these polyesters, obtainable according to said Patent, in four respects: The end groups must be hydroxyl groups, the alkyl groups on the nitrogen carry a secondary hydroxyl group in the β-position to the amino group, the substituents of the phenylene radicals located in the p-position to the nitrogen atom are restricted to lower alkyl radicals, and the dicarboxylic acids used for the manufacture of the polyesters are restricted to those in which the radical linking the two carboxyl groups to one another corresponds to the radical $R_3$ of the above formula, with straight-chain or branched alkylene groups with four to 12 carbon atoms being preferred.

The new polyesters have the advantage compared with those known from the Patent mentioned above that when added as curing accelerators to unsaturated polyester resin mixtures as described in said patent they impart a high reactivity to the polyester compositions after addition of a diacyl peroxide, which remains largely constant even after prolonged storage of the mixtures prior to the addition of the peroxide, but above all that the cured products hardly discolour, in particular even on ageing.

The new polyesters can be manufactured by polycondensation of suitable dicarboxylic acids of the formula 2

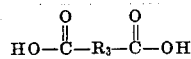

with a greater or lesser molar excess of a tertiary amine of formula

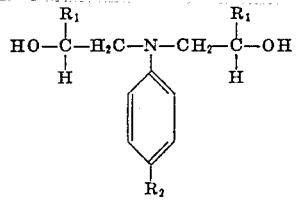

(3)

with heating, optionally with the addition of esterification catalysts and with inert gas being passed through.

As greater said excess of the tertiary amine is as lower is the value of n in formula 1 and vice versa. Suitable excesses are, for example, from 100 to about 1 and preferable from about 50 to about 10 mol percent.

Amines which correspond to the above formula are, for example, N-bis-(β-hydroxypropyl)-p-toluidine, N-bis-(β-hydroxypropyl)-p-tert.butylaniline and N-bis-(β-hydroxybutyl)-p-ethylaniline.

Suitable dicarboxylic acids are, for example, adipic acid, pimelic acid, sebacic acid, cyclohexane-1,4-dicarboxylic acid, cyclohexane-1,2-trans-dicarboxylic acid, isophthalic acid and terephthalic acid.

The Table which follows indicates the effect of adding various nitrogen-containing polyesters (1,2,3 and 4) to two different polyester casting resins after adding 3 percent by weight of benzoyl peroxide past in each case. Accelerator 1 denotes the known polycondensation product from 0,78 mol equivalent of phthalic anhydride and 1 mol equivalent of N-bis-(β-hydroxyethyl)-p-toluidine, and accelerator 3 denotes the polycondensation product from 0.78 mol equivalent of adipic acid and again 1 mol equivalent of N-bis-(β-hydroxyethyl)-p-toluidine, and accelerator 3 denotes the polycondensation product of 1 mol equivalent of adipic acid and again 1 mol equivalent of N-bis-(β-hydroxyethyl)-p-toluidine. These accelerators do not correspond to the invention; only accelerator 4 corresponds to the invention; it is the condensation product from 0.78 mol equivalent of adipic acid and 1 mol equivalent of N-bis-(β-hydroxypropyl)-p-toluidine. Each of these polyesters has an acid number of about 10, is stabilised by adding 0.1 per cent by weight of hydroquinone, and is dissolved in styrene at 90° to 100°C to give a solution of 70 percent by weight solids content.

The polyester casting resin A is a 69 per cent by weight solution of a polyester of acid number 32 from 5421 parts by weight of phthalic anhydride, 3210 parts by weight of maleic anhydride and 5616 parts by weight of 1,2-propylene glycol, in styrene, having a viscosity of 300 cP at 20°C, and stabilised by adding 0.009 per cent by weight of toluhydroquinone and 20 ppm of copper naphthenate.

The polyester casting resin B is a 65 percent by weight solution of a polyester of acid number 23 from 3292 parts by weight of phthalic anhydride, 3270 parts by weight of maleic anhydride and 4438 parts by weight of 1,2-propylene glycol in styrene, having a viscosity of 1100 cP at 20°C, stabilised by the addition of 0.025 per cent by weight of hydroquinone.

After weathering the curing products in the Weatherometer, the samples with accelerators 1 and 2 were light brown after 100 hours and red-brown after 250 hours, whilst the samples with accelerator 4 barely showed a yellowish discolouration after 100 hours and only a weak yellowish discolouration after 250 hours.

What is claimed is:

1. Polyesters of the formula:

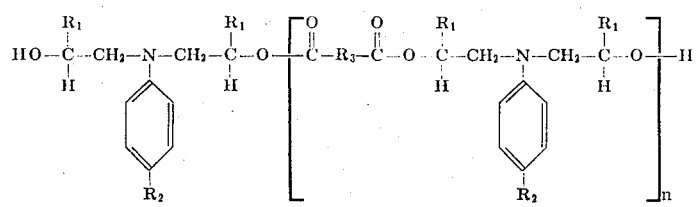

wherein $R_1$ is methyl or ethyl, $R_2$ is alkyl having from one to six carbon atoms, $R_3$ is alkylene having from four to 12 carbon atoms or cyclohexylene of which the dicarboxylic acids do not form cyclic anhydrides and n is an integer of from 1 to 100.

2. The polyester of claim 1 wherein $R_1$ and $R_2$ are each methyl and $R_3$ is $-(CH_2)_4-$.

| | Amount of 70% strength styrene solution added, percent | Percent N in the casting resin solution | Immediate | | After 1 week | | After 2 weeks | | After 4 weeks | | Colour index of the cured moulding (iodine colour index) |
|---|---|---|---|---|---|---|---|---|---|---|---|
| | | | Gel time | Curing time | Gel time | Curing time | Gel time | Curing time | Gel time | Curing time | |
| | | | | | Casting resin A | | | | | | |
| Accelerator: | | | | | | | | | | | |
| 1 | 2.5 | 0.0812 | 4.5' | 8.75' | 5.5' | 6.5' | 6.5' | 11.25' | 6.5' | 11.25' | 130–160 |
| 2 | 1.2 | 0.0419 | 6.25' | 12' | 11' | 18' | 12' | 16.5' | 12' | 16.0' | 60–80 |
| 3 | 5.0 | 0.160 | 9.25' | 18' | Not measured | | | | 9.5' | 18.5' | (¹) |
| 4 | 1.2 | 0.0386 | 5.25' | 10.5' | 6' | 11.75' | 6.75' | 12.75' | 7' | 12.75 | 60–80 |
| | | | | | Casting resin B | | | | | | |
| 1 | 2.5 | 0.0812 | 5.25' | 10' | Not measured | | | | 8.5' | 13.0' | 130–160 |
| 2 | 1.5 | 0.0525 | 7.0' | 11.5' | 8.5' | 13' | 9.75' | 15.3' | 10.25' | 16.0' | 80–130 |
| 4 | 1.5 | 0.0483 | 5.5' | 10.0' | 5.5' | 10.75' | 6.0' | 11.0' | 6.0' | 11.0' | 60–80 |

¹ Approximately 100.